United States Patent
Liu et al.

(10) Patent No.: US 8,970,826 B2
(45) Date of Patent: Mar. 3, 2015

(54) AUTOMATIC FOCUSING APPARATUS AND METHOD

(75) Inventors: Chien-Sheng Liu, Tainan (TW); Pin-Hao Hu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 982 days.

(21) Appl. No.: 13/093,556

(22) Filed: Apr. 25, 2011

(65) Prior Publication Data

US 2012/0133819 A1 May 31, 2012

(30) Foreign Application Priority Data

Nov. 25, 2010 (TW) ................................ 99140848 A

(51) Int. Cl.
- *G01C 3/08* (2006.01)
- *G02B 27/16* (2006.01)
- *G02B 7/36* (2006.01)
- *G02B 21/24* (2006.01)

(52) U.S. Cl.
CPC *G02B 27/16* (2013.01); *G02B 7/36* (2013.01); *G02B 21/245* (2013.01)
USPC ........................................ 356/4.03; 356/4.01

(58) Field of Classification Search
CPC ................... G01N 2021/95615; G02B 23/10; G02B 21/245; G02B 27/16; G02B 7/36
USPC ............ 356/4.03, 40.1, 4.04, 4.05, 4.06, 125; 359/626, 629, 634, 823, 698; 396/89, 396/139; 348/345, 349, 351, E5.045
See application file for complete search history.

(56) References Cited

U.S. PATENT DOCUMENTS

| 4,311,904 A | 1/1982 | Okada et al. |
| 4,783,589 A | 11/1988 | Ando |
| 4,798,948 A | 1/1989 | Neumann et al. |
| 4,841,509 A | 6/1989 | Kamisada |

(Continued)

FOREIGN PATENT DOCUMENTS

| CN | 101019058 | 8/2007 |
| CN | 100570341 C | 12/2009 |

(Continued)

OTHER PUBLICATIONS

Full English (machine) translation of CN100570341 (Published Dec. 16, 2009).

(Continued)

*Primary Examiner* — Tri T Ton
(74) *Attorney, Agent, or Firm* — McClure, Qualey & Rodack, LLP

(57) ABSTRACT

An automatic focusing apparatus and a method thereof are provided. The apparatus includes a light source, an optical imaging unit, a photo-sensor and a focusing regulation unit. The optical imaging unit includes an object lens and a beam splitter. The beam splitter divides a reflecting beam into a first sub-beam and a second sub-beam. The optical imaging unit has a first imaging optical path and a second imaging optical path with different imaging precisions corresponding to the first sub-beam and the second sub-beam, respectively. The photo-sensor detects a defocus position of the object. The focusing regulation unit adjusts the distance between the object and the object lens and selects an imaging precision, so that the defocus position of the object is placed within the imaging precision of the first optical path and the imaging precision of the second optical path in sequence.

12 Claims, 6 Drawing Sheets

(56) References Cited

U.S. PATENT DOCUMENTS

| | | |
|---|---|---|
| 5,151,887 A | 9/1992 | Miyazaki |
| 5,245,173 A | 9/1993 | Yamana et al. |
| 6,649,893 B2 | 11/2003 | Fujimoto et al. |
| 6,822,801 B2 | 11/2004 | Yahagi et al. |
| 7,271,919 B2 | 9/2007 | Schick |
| 7,298,549 B2 | 11/2007 | Muller |
| 2007/0164194 A1 | 7/2007 | Kurata et al. |
| 2008/0002252 A1 | 1/2008 | Weiss et al. |

FOREIGN PATENT DOCUMENTS

| | | |
|---|---|---|
| CN | 101770065 A | 7/2010 |
| TW | 200825450 | 6/2008 |

OTHER PUBLICATIONS

English Abstract translation of CN101770065 (Published Jul. 7, 2010).

English language translation of abstract of TW 200825450 (published Jun. 16, 2008).

Wright, E.F., et al.; "A Low-Cost Automated Focusing System for Time-Lapse Microscopy;" Measurement Science and Technology; 2009; pp. 1-5.

Chang, H.C., et al.; "A Microscope System Based on Bevel-Axial Method Auto-Focus;" Optics and Lasers in Engineering; 2009; pp. 547-551.

Hsu, W.Y., et al.; "Development of the Fast Astigmatic Auto-Focus Microscope System;" Measurement Science and Technology; 2009; pp. 1-10.

AUTOMATIC FOCUSING APPARATUS AND METHOD

This application claims the benefit of Taiwan application Serial No. 99140848, filed Nov. 25, 2010, the subject matter of which is incorporated herein by reference.

BACKGROUND

1. Technical Field

The disclosure relates in general to a focusing apparatus and method thereof, and more particularly to an automatic focusing apparatus automatically adjusting the imaging precision and a method thereof.

2. Description of the Related Art

As the electronic industry has gained booming growth in recent years, the miniaturization of consumer electronic products such as mobile phone, camera, and projector has become a mainstream trend in the market. In response to the needs of the electronic industry, the processing and formation methods of critical parts and assemblies are critical to the electronic industry. Conventional mechanical processing methods, being subjected to the blade size and mechanism restrictions, are found to be insufficient, and are gradually replaced by laser processing with higher precision and faster speed such as laser drilling and laser cutting. To avoid the laser processing being affected by the surface roughness of the work piece, the focal points must all be placed on the processing surface during laser processing. Thus, the laser processing will not fail due to insufficient processing energy, and the dimension error will not occur due to the area of light spots being too big. To achieve the object of processing precision, an automatic focusing apparatus is used.

The conventional automatic focusing method normally adapts the optical type automatic focusing apparatus, which has higher precision and is more expensive than the image type automatic focusing apparatus. Thus, the optical type automatic focusing apparatus still has the problem of higher cost, larger volume and higher complexity in assembly alignment. In addition, the larger the focusing times performed by optical type automatic focusing apparatus, the longer the processing time will be required, and this is disadvantageous to the reduction in production cost, and needs to be improved further.

SUMMARY

The disclosure is directed to an automatic focusing apparatus a method thereof. The defocus position of the object is adjusted according to two imaging optical paths with different imaging precisions so as to reduce the focusing time.

The disclosure provides an automatic focusing apparatus, which includes a light source, an optical imaging unit, a photo-sensor and a focusing regulation unit. The light source generates a beam. The optical imaging unit includes an object lens and a beam splitter. The object lens focuses the beam, so that the beam is projected on an object. The beam is reflected via the object to form a reflecting beam. The beam splitter divides the reflecting beam into a first sub-beam and a second sub-beam. The optical imaging unit has a first imaging optical path and a second imaging optical path with different imaging precisions corresponding to the first sub-beam and the second sub-beam, respectively. The photo-sensor senses an image formed by the first sub-beam or the second sub-beam to detect a defocus position of the object. The focusing regulation unit, according to the defocus position of the object, adjusts a distance between the object and the object lens and selects an imaging precision, so that the defocus position of the object is placed within the imaging precision of the first optical path and the imaging precision of the second optical path in sequence.

The disclosure provides an automatic focusing apparatus, which includes a light source, an optical imaging unit, a photo-sensor and a focusing regulation unit. The light source generates a beam. The optical imaging unit includes an object lens and a reflective lens. The object lens focuses the beam, so that the beam is projected on an object. The beam is reflected via the object to form a reflecting beam. The reflective lens switches the reflecting beam to a first imaging optical path or a second imaging optical path. The photo-sensor senses an image formed in the first imaging optical path and the second imaging optical path to detect a defocus position of the object. The focusing regulation unit, according to the defocus position of the object, adjusts a distance between the object and the object lens and selects an imaging precision, so that the defocus position of the object is placed within the imaging precision of the first optical path and the imaging precision of the second optical path in sequence.

The disclosure further provides an automatic focusing method, which includes the following steps. A beam is emitted. The beam is focused by an object lens, so that the beam is projected on an object and reflected via the object to form a reflecting beam. The reflecting beam is divided into a first sub-beam and a second sub-beam which are respectively placed in a first imaging optical path and a second imaging optical path with different imaging precisions. The image formed by the first sub-beam or the second sub-beam is sensed by a photo-sensor for detecting a defocus position of the object. A first focusing is performed on a distance between the object and the object lens according to the defocus position of the object, so that the defocus position of the object is placed within the imaging precision of the first optical path. The imaging precision corresponding to the second imaging optical path is selected and a second focusing is performed on the distance between the object and the object lens, so that the defocus position of the object are placed within the imaging precision of the second optical path.

The disclosure provides an automatic focusing apparatus, which includes a light source, a wave plate, an object lens, a polarized beam splitter, a photo-sensor and a focusing regulation unit. The light source generates a linear polarization beam. The wave plate changes a linear polarization direction of a portion of linear polarization beam. The object lens enables the linear polarization beam to be projected on an object, which further reflects the portion of linear polarization beam to form a reflecting beam. The polarized beam splitter divides the reflecting beam into a first sub-beam and a second sub-beam. The photo-sensor senses the image formed by the first sub-beam or the second sub-beam to detect a defocus position of the object. The focusing regulation unit, according to the defocus position of the object, adjusts a distance between the object and the object lens, so that the defocus position of the object is closer to the focus position of the object lens.

The disclosure further provides an automatic focusing method, which includes the following steps. A linear polarization beam is emitted. The linear polarization direction of a portion of linear polarization beam is changed by a wave plate. The linear polarization beam is focused by an object lens, so that the linear polarization beam is projected on an object, which further reflects a portion of linear polarization beam to form a reflecting beam. The reflecting beam is divided into a first sub-beam and a second sub-beam by a polarized beam splitter. The image formed by the first sub-beam or the second sub-beam is sensed by a photo-sensor to detect a defocus position of the object. The distance between the object and the object lens is adjusted according to the defocus position of the object, so that the defocus position of the object is closer to the focus position of the object lens.

The above and other aspects of the disclosure will become better understood with regard to the following detailed description of the non-limiting embodiment(s). The following description is made with reference to the accompanying drawings.

DETAILED DESCRIPTION

According to an automatic focusing apparatus of the present embodiment and a method thereof, the beam emitted by the light source is divided into a first sub-beam and a second sub-beam in different optical paths. The first sub-beam and the second sub-beam form an image such as a light spot on a photo-sensor, which detects a defocus position of the object and a focusing error according to the size of the light spot. For example, when the defocus position of the object is placed before, after or at the focal point of the object lens, the image size of the first sub-beam as well as the image size of the second sub-beam will vary with the position of the object. Thus, the photo-sensor detects whether the object is placed at the near focus position, the far focus position or the focal point position according to the light spots. Thus, the present embodiment of the disclosure can adjust the distance between the object and the object lens according to the defocus position of the object sensed by the photo-sensor, so that the defocus position of the object is closer to the focus position of the object lens and the focusing time is reduced.

Figure 1:
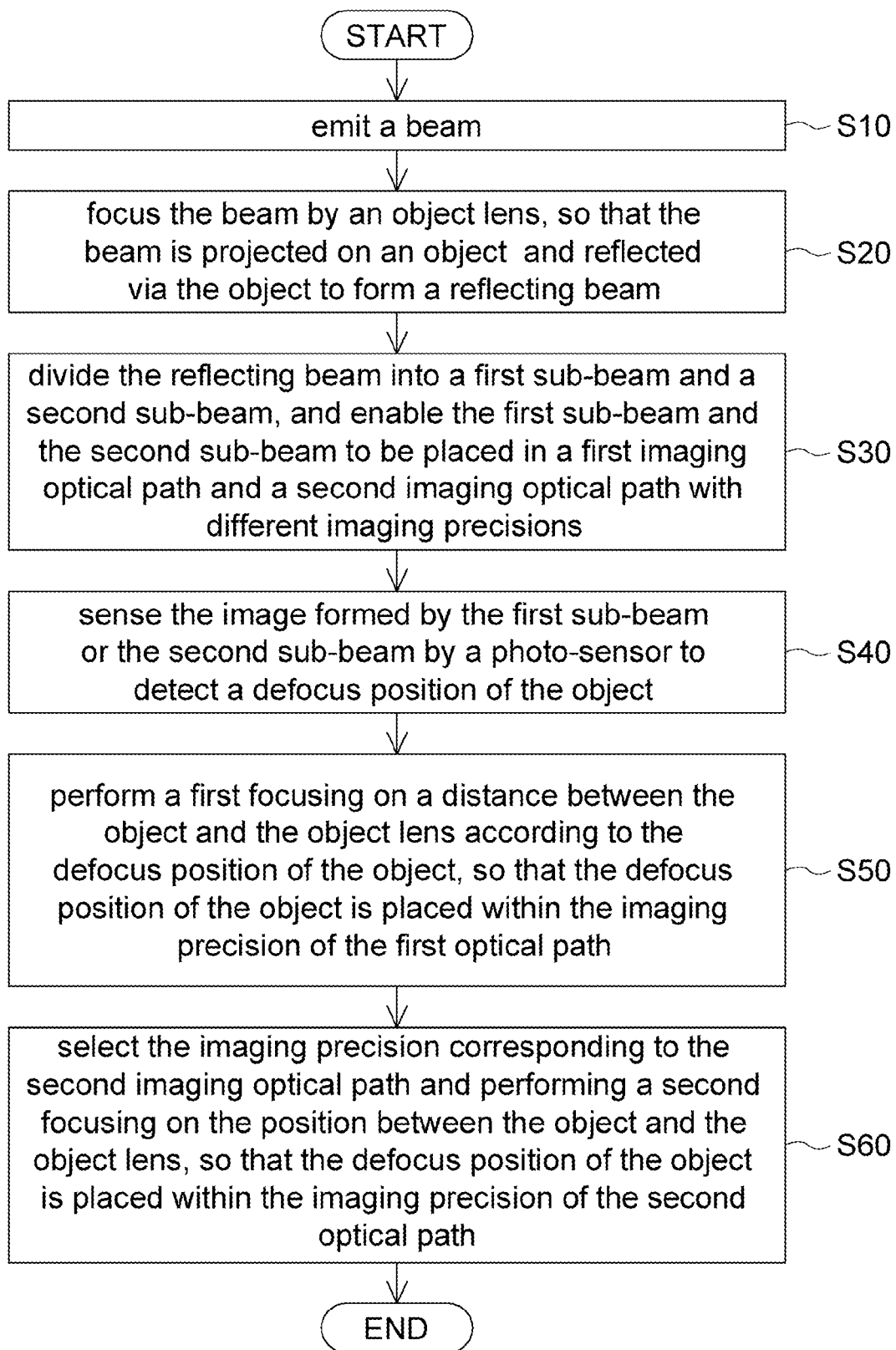
FIG. 1 shows a flowchart of an automatic focusing method according to an embodiment of the disclosure.
Figure 2:
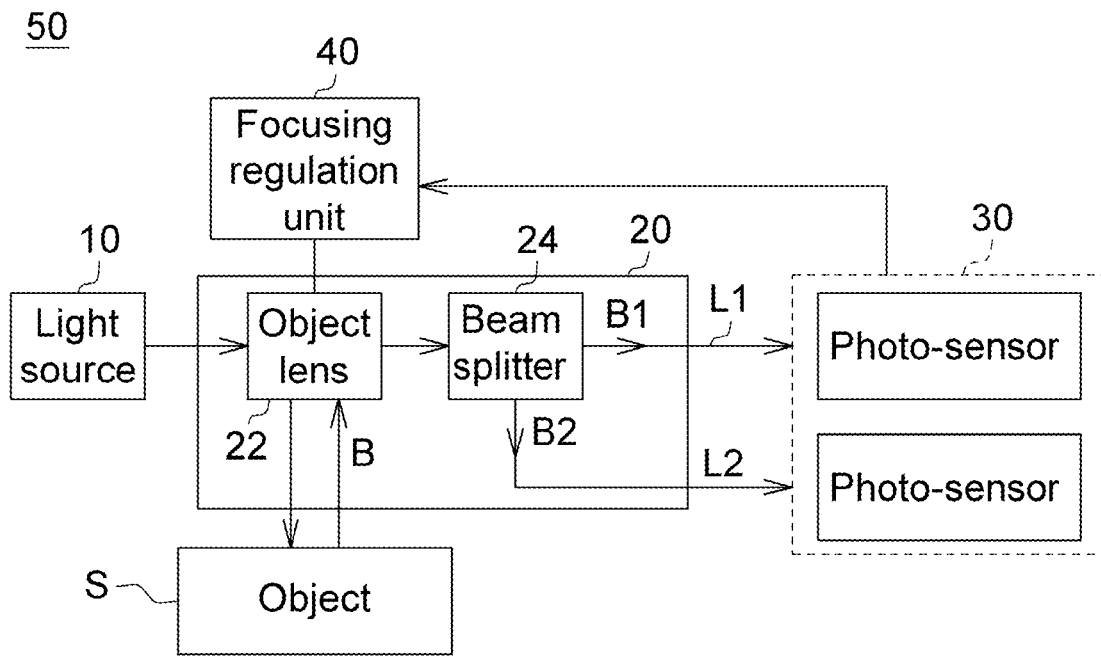
FIG. 2 shows an automatic focusing apparatus according to an embodiment of the disclosure.

Referring to both FIGS. 1 and 2. FIG. 1 shows a flowchart of an automatic focusing method according to an embodiment of the disclosure. The automatic focusing method includes steps S10~S60. FIG. 2 shows an automatic focusing apparatus according to an embodiment of the disclosure. As indicated in FIG. 2, the automatic focusing apparatus 50 includes a light source 10, an optical imaging unit 20, a photo-sensor 30 and a focusing regulation unit 40. The optical imaging unit 20 includes an object lens 22 and a beam splitter 24. The object lens 22 focuses a beam, so that the beam is projected on an object S. The beam is reflected via the object S to form a reflecting beam B. The beam splitter 24 divides the reflecting beam B into a first sub-beam B1 and a second sub-beam B2, so that the first sub-beam B1 and the second sub-beam B2 enter a first imaging optical path L1 and a second imaging optical path L2 with different imaging precisions. In addition, the photo-sensor 30 senses the image formed by the first sub-beam B1 and/or the second sub-beam B2 to detect a defocus position of the object S. Besides, the focusing regulation unit 40 performs coarse adjustment and fine adjustment on the distance between the object S and the object lens 22 according to the defocus position of the object S, so that the defocus position of the object S is closer to the focal point of the object lens 22.

In another embodiment, the beam splitter 24 can be replaced by a reflective lens 209 (referring to FIGS. 8 and 9) for switching the optical path of the reflecting beam B to the first imaging optical path L1 or the second imaging optical path L2. Then, the photo-sensor 30 detects the defocus position of the object S, and the focusing regulation unit 40 performs focusing, so that the defocus position of the object S is closer to the focal point of the object lens 22.

The automatic focusing method of FIG. 1 is elaborated below with the automatic focusing apparatus 50 of FIG. 2.

The method begins at step S10 as indicated in FIG. 1, a beam is emitted. In the step S20, the beam is focused by an object lens 22, so that the beam is projected on an object S. The beam is reflected via the object S to form a reflecting beam B. In the step S30, the reflecting beam B is divided into a first sub-beam B1 and a second sub-beam B2 by a beam splitter 24, and the first sub-beam B1 and the second sub-beam B2 are placed in a first imaging optical path L1 and a second imaging optical path L2 with different imaging precisions. In the step S40, the image formed by the first sub-beam B1 or the second sub-beam B2 is sensed by a photo-sensor 30 to detect a defocus position of the object S. In the step S50, a first focusing is performed onto a distance between the object S and the object lens 22 according to the defocus position of the object S, so that the defocus position of the object S is placed within the imaging precision of the first imaging optical path L1. In the step S60, the imaging precision corresponding to the second imaging optical path is selected, and a second focusing is performed onto the distance between the object S and the object lens 22, so that the defocus position of the object S is placed within the imaging precision of the second imaging optical path L2.

In the present embodiment of the disclosure, the light source 10 can be realized by a coherent light source or a non-coherent light source, such as laser light source, LED light source or candescent light source. The photo-sensor 30 can be realized by photo diode array (PD array), charge-coupled device (CCD) or complementary metal oxide semiconductor (CMOS) photo-sensor. The number of photo-sensor 30 is not limited to two. For example, one single photo-sensor 30 can be used to sense the first sub-beam B1 and the second sub-beam B2 corresponding to different optical paths to reduce cost and volume for the automatic focusing apparatus. In addition, the focusing regulation unit 40 may include programmable step motor and driver for processing the signals obtained from one or more than one photo-sensor 30, and driving the object lens 22 or the object S to move relatively, so that the defocus position of the object S is closer to the focal point of the object lens 22.

Figure 3:
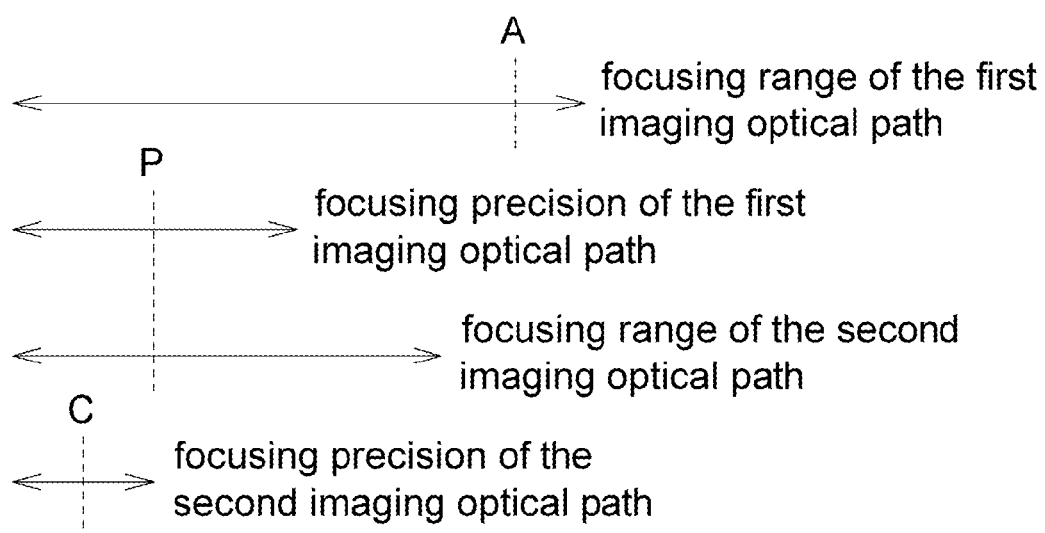
FIG. 3 shows a relationship diagram between the defocus position of the object and the imaging optical path with different imaging precisions.

Referring to FIGS. 1~3. FIG. 3 shows a relationship diagram between the defocus position of the object and the imaging optical path with different imaging precisions. In the step S50, when the distance between the object S and the object lens 22 is within the focusing range of the first imaging optical path L1, such as at point A, the focusing regulation unit can perform coarse adjustment on the distance between the object S and the object lens 22 according to the defocus position of the object S, so that the defocus position of the object S is closer to the focal point of the object lens 22. For example, the defocus position is shifted from the point A to a point P, which is placed within the imaging precision of the first imaging optical path L1. Then, in the step S60, when the defocus position is at the point P and exactly placed within the focusing range of the second imaging optical path L2, the defocus position of the object S can be detected according to the image formed by the second sub-beam B2. Meanwhile, the focusing regulation unit 40 performs fine adjustment on the distance between the object S and the object lens 22 according to the defocus position, so that the defocus position of the object S is closer to the focal point of the object lens 22. For example, the defocus position is shifted from the point P to a point C, which is placed within the imaging precision of the second imaging optical path L2. Thus, the automatic focusing apparatus of the present embodiment and the method thereof reduce the focusing time by only two focusing steps.

For example, when the sensed defocus position is about 893 μm (such as point A) and the defocus position is placed within the focusing range of the first imaging optical path L1 (such as ±900 μm), a first focusing is performed according to the image formed by the first sub-beam B1 and the imaging precision of the image, so that the defocus position is shifted from 893 μm to around 23 μm (such as point P), and the defocus position of the point P is placed within the imaging precision of the first imaging optical path L1 (such as ±30 μm). Thus, the first focusing is basically completed. Due to the restriction of the imaging precision of the first imaging optical path L1, a second focusing can be performed by switching to the second imaging optical path L2 or by detecting the image formed by the second sub-beam B2.

As disclosed above, when the defocus position of the point P is exactly placed within the focusing range of the second imaging optical path L2 (such as ±60 μm), the second focusing is performed according to the image formed by the second sub-beam B2 and the imaging precision of the image, so that the defocus position is shifted from 23 μm to around 1 μm (such as point C), and the defocus position of the point C is placed within the imaging precision of the second imaging optical path L2 (such as ±2 μm). Thus, the second focusing is basically completed.

According to the present embodiment of the disclosure, the defocus position is shifted from point A to point C in only two focusing steps, so that the focusing time is obviously shortened. With respect to the embodiment in which only the first imaging optical path L1 is used, the present embodiment of the disclosure increases the imaging precision by 15 times (±30 μm is reduced to ±2 μm). With respect to the embodiment in which only the second imaging optical path L2 is used, the present embodiment of the disclosure also increases the focusing range by 15 times (±60 μm is increased to ±900 μm). Thus, the present embodiment of the disclosure integrates the imaging precision and the focusing range of two different imaging optical paths. Provided that the overall precision is not affected, the focusing range and the focusing speed of automatic focusing are increased so that the focusing time is reduced accordingly.

The automatic focusing apparatus with different designs of optical path is elaborated in a number of embodiments below.

First Embodiment

Figure 4:
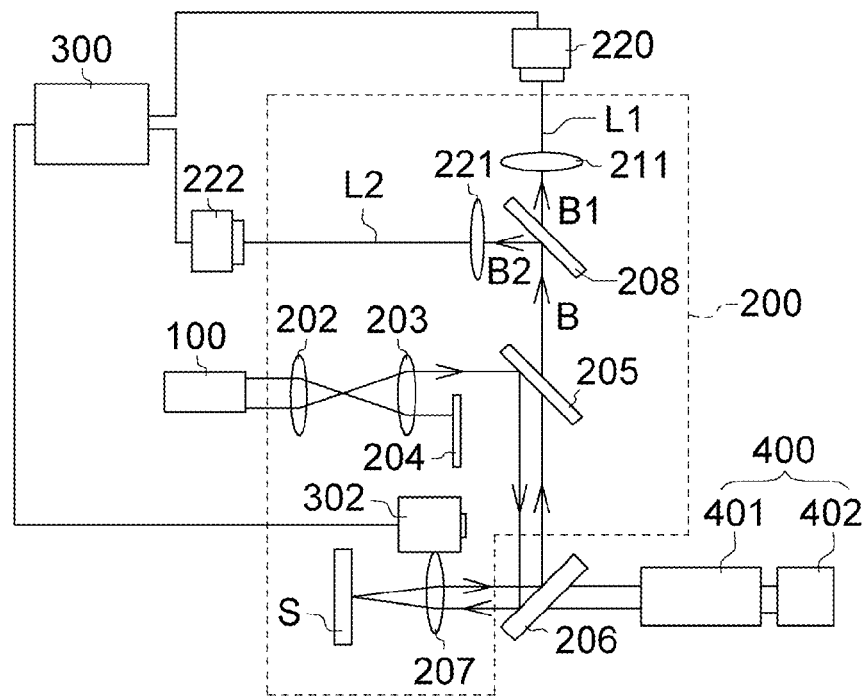
FIG. 4 shows an optical path of automatic focusing apparatus according to the first embodiment.

Referring to FIG. 4, an optical path of automatic focusing apparatus according to the first embodiment is shown. As indicated in FIG. 4, the automatic focusing apparatus includes a light source 100, an optical imaging unit 200, two photo-sensors 220 and 222 and a focusing regulation unit 300. In addition, the automatic focusing apparatus further uses a microscopic observation unit 400 for observing a real-time image, wherein the microscopic observation unit 400 includes an infinite optical path correction system 401 and an observation camera 402. The optical imaging unit 200 includes a beam shaping lens set 202, 203, a photo interrupter 204, multiple beam splitters 205, 206 and 208, an object lens 207, a first magnification adjustment lens 211 and a second magnification adjustment lens 221. The optical imaging unit 200 further divides the beam into a first imaging optical path L1 and a second imaging optical path L2 by the beam splitter 208. The first magnification adjustment lens 211 with a first focal length is placed in the first imaging optical path L1. The first magnification adjustment lens 211 focuses the first sub-beam B1 on a photo-sensor 220. In addition, the second magnification adjustment lens 221 with a second focal length is placed in a second imaging optical path L2. The second magnification adjustment lens 221 focuses the second sub-beam B2 on another photo-sensor 222.

Figure 5:
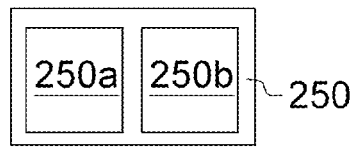
FIG. 5 shows a single photo-sensor according to an embodiment.

As indicated in FIG. 4, the light source 100 emits a beam, which passes a set of beam shaping lenses 202 and 203 and forms a collimated cylindrical parallel beam. The cylindrical parallel beam, after passing through the photo interrupter 204, forms a semi-cylindrical parallel beam. The semi-cylindrical parallel beam, having been reflected via the beam splitters 205 and 206 and focused by the object lens 207, is projected on the object S. The beam, after having been reflected via the object S and focused by the object lens 207, is divided into a first sub-beam B1 and a second sub-beam B2 after passing through the beam splitters 206, 205 and 208. The first sub-beam B1, after passing through the first magnification adjustment lens 211, is projected on the first the photo-sensor 220. The second sub-beam B2, after passing through the second magnification adjustment lens 221, is projected on the second photo-sensor 222. Since the first magnification adjustment lens 211 and the second magnification adjustment lens 221 have different focuses (or different magnification rates), the imaging precision of the first imaging optical path L1 and the imaging precision of the second imaging optical path L2 would also be different. The smaller the focus, the worse the imaging precision. To the contrary, the larger the focus, the better the imaging precision. In the present embodiment, the focusing regulation unit 300 adjusts the distance between the object S and the object lens 207 by a driver 302 according to the first imaging optical path L1 and the second imaging optical path L2 with different imaging precisions, so that the defocus position of the object S is closer to the focal point of the object lens 207 like the focusing method as indicated in FIG. 3 to reduce the focusing time. In the present embodiment, the photo-sensor can be realized by a single photo-sensor 250. As indicated in FIG. 5, the photo-sensor 250 has a first sensing region 250a (forming the first the photo-sensor 220) and a second sensing region 250b (forming the second photo-sensor 222) for sensing the image formed by the first sub-beam B1 and the second sub-beam B2 respectively.

Second Embodiment

Figure 6:
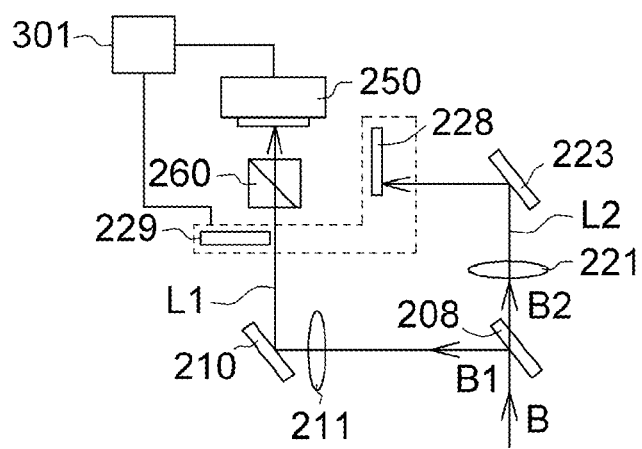
FIGS. 6 and 7 respectively show an optical path of an automatic focusing apparatus according to the second embodiment.
Figure 7:
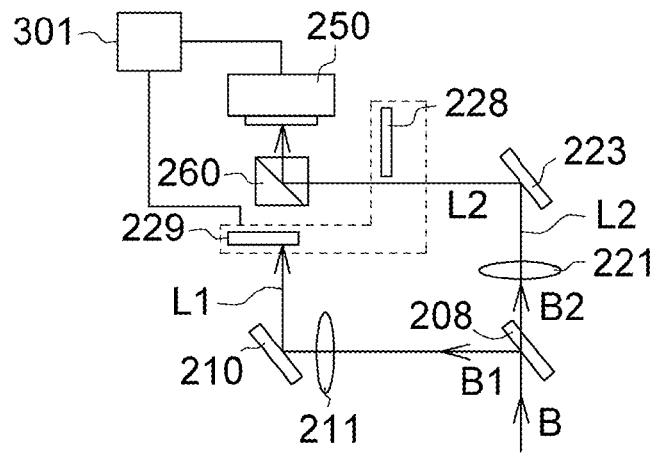

Referring to FIGS. 6 and 7. The first imaging optical path L1 and the second imaging optical path L2 can be disposed in the same manner as indicated in FIGS. 6 and 7. The optical path switch 229 and the optical path switch 228 can be movably disposed in the first imaging optical path L1 and the second imaging optical path L2 respectively that the reflecting beam B passes through before entering the photo-sensor 250.

As indicated in FIG. 6, after the reflecting beam B is divided into a first sub-beam B1 and a second sub-beam B2 by the beam splitter 208, the first sub-beam B1, having been focused by the first magnification adjustment lens 211 and reflected via a reflective lens 210, is not blocked by the optical path switch 229 and directly enter the beam splitter 260 and form an image on the photo-sensor 250, so that the photo-sensor 250 can detect the defocus position of the object S with the image. Moreover, the second sub-beam B2, having been focused by the second magnification adjustment lens 221 and reflected via a reflective lens 223, is blocked by another optical path switch 228 and cannot be projected on the photo-sensor 250.

As indicated in FIG. 7, when the optical path switches 228 and 229 are driven to shift their positions, the first sub-beam B1 is blocked by the optical path switch 229 and cannot be projected on the photo-sensor 250, but the second sub-beam B2, being not blocked by another optical path switch 228, enter a photo divider 260 and forms an image on the photo-sensor 250, so that the photo-sensor 250 can detect the defocus position of the object S with the image. Thus, the optical path switches 228 and 229 can be used for switching the first sub-beam B1 and the second sub-beam B2.

In the present embodiment of the disclosure, the optical path switches 228 and 229 can be driven by a focusing regulation unit 301 or another controller (not illustrated) for switching the first imaging optical path L1 and the second imaging optical path L2 with different imaging precisions and adjusting the distance between the object S and the object lens 207 by the focusing regulation unit 301, so that the defocus position of the object S is closer to the focal point position of the object lens 207 like the focusing method as indicated in FIG. 3 to save the focusing time.

In the present embodiment of the disclosure, the number of the optical path switches 228 and 229 is not limited to two, and the two switches can be integrated into one optical path switch to save cost.

Third Embodiment

Figure 8:
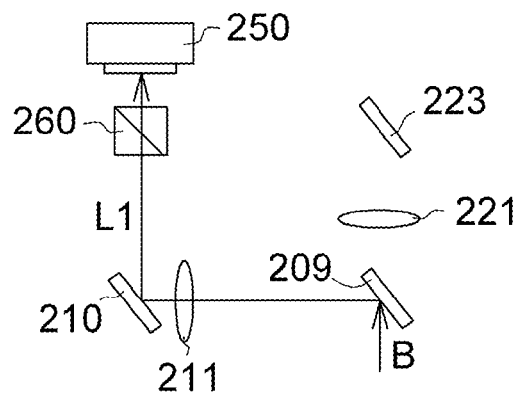
FIGS. 8 and 9 respectively show an optical path of an automatic focusing apparatus according to a third embodiment.
Figure 9:
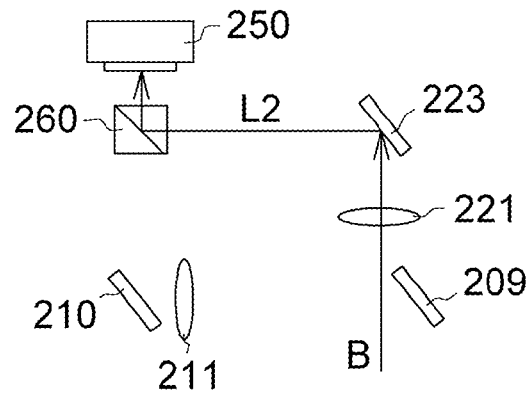

Referring to FIGS. 8 and 9. In the present embodiment, the photo-sensor can be realized by a single photo-sensor 250. The first imaging optical path L1 and the second imaging optical path L2 can be disposed in the same manner as indicated in FIGS. 8 and 9. The reflective lens 209 can be movably disposed in the optical path that the reflecting beam B passes through before entering the photo-sensor 250.

As indicated in FIG. 8, when the reflecting beam B is reflected via the reflective lens 209 and enters the first imaging optical path L1, the reflecting beam B, having been focused by the first magnification adjustment lens 211 and reflected via a reflective lens 210, directly enters the beam splitter 260 and forms an image on the photo-sensor 250, so that the photo-sensor 250 can detect the defocus position of the object S with the image.

As indicated in FIG. 9, when the reflective lens 209 is driven and shits its position, the reflecting beam B is not reflected via the reflective lens 209 and directly enters the second imaging optical path L2. After the reflecting beam B is focused by the second magnification adjustment lens 221 and reflected via a reflective lens 223, the reflecting beam B enters the beam splitter 260 and forms an image on the photo-sensor 250 for the photo-sensor 250 to detect the defocus position of the object S with the image. Thus, the reflective lens 209 can be used for changing the optical path of the reflecting beam B.

In the present embodiment of the disclosure, the reflective lens 209 can be driven by the focusing regulation unit 301 or other controller (not illustrated) for changing the optical path of the reflecting beam B into the first imaging optical path L1 or the second imaging optical path L2 with different imaging precisions, and adjusting the distance between the object S and the object lens 207 by the focusing regulation unit 301, so that the defocus position of the object S is closer to the focal point position of the object lens 207 like the focusing method as indicated in FIG. 3 to save the focusing time.

Fourth Embodiment

Figure 10:
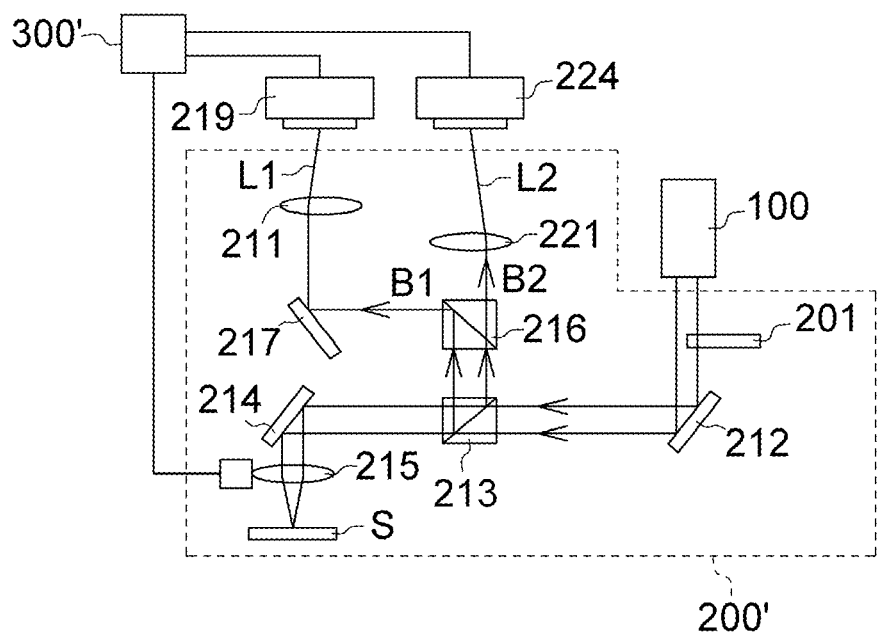
FIGS. 10 and 11 respectively show an optical path of an automatic focusing apparatus according to a fourth embodiment.
Figure 11:
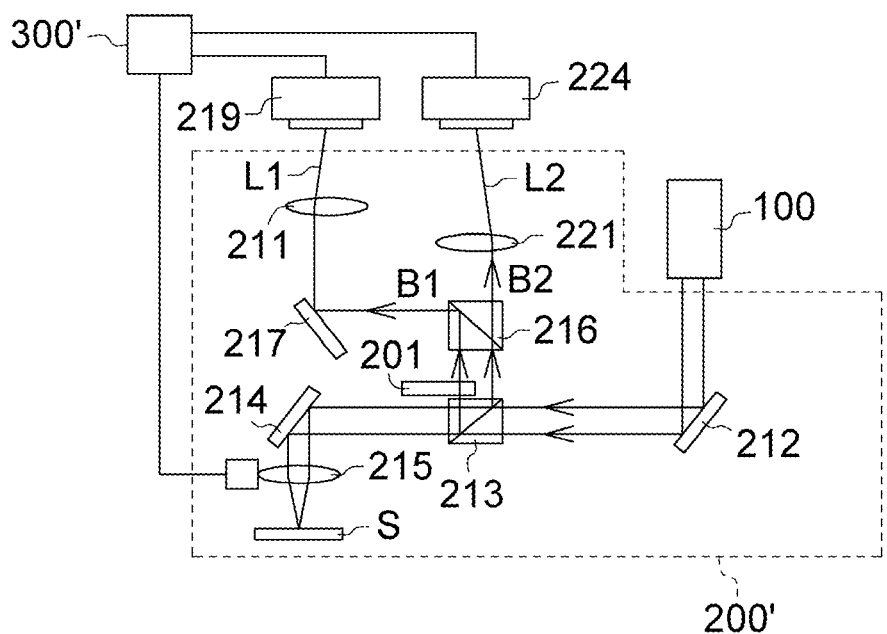

Referring to the two embodiments as indicated in FIGS. 10 and 11. The optical imaging unit 200' further includes a wave plate 201, such as a λ/2 wave plate. The two embodiments mainly differ in that in the embodiment of FIG. 10, the wave plate 201 is disposed in the optical path beam that the beam passes through before the beam is projected on the object S, while in the embodiment of FIG. 11, the wave plate 201 is disposed in the optical path beam that the beam passes through after the beam is projected on the object S. The wave plate 201 changes the polarity of a portion of the beam but keeps its shape and strength. With respect to the first embodiment, the strength of the light sensed by the first the photo-sensor 219 and the second photo-sensor 224 of the present embodiment can be doubled to enhance the signal noise ratio (SNR) of the light signal. Here below, only the embodiment of FIG. 10 is elaborated below. As for the elements and disposition of FIG. 11 that are similar to that of FIG. 10, the same designations are used and the similarities are not repeated.

Referring to FIG. 10, the automatic focusing apparatus includes a light source 100, an optical imaging unit 200', two photo-sensors 219 and 224 and a focusing regulation unit 300'. The optical imaging unit 200' includes a wave plate 201, multiple reflective lenses 212, 214 and 217, a beam splitter 213, an object lens 215, a polarized beam splitter 216, a first magnification adjustment lens 211 and a second magnification adjustment lens 221. The optical imaging unit 200' divides the beam into a first imaging optical path L1 and a second imaging optical path L2 by the polarized beam splitter 216. The first magnification adjustment lens 211 with a first focal length is placed in the first imaging optical path L1. The first magnification adjustment lens 211 focuses the first sub-beam B1 on a photo-sensor 219. In addition, the second magnification adjustment lens 221 with a second focal length is placed in the second imaging optical path L2. The second magnification adjustment lens 221 focuses the second sub-beam B2 on another photo-sensor 224.

As indicated in FIG. 10, the light source 100 emits a P-polarity linear polarization collimated cylindrical parallel beam. The beam, after passing through the λ/2 wave plate 201, forms a P polarity semi-cylindrical parallel beam and an S polarity semi-cylindrical parallel beam. The beam, after the beam further passes through the reflective lens 212, the beam splitter 213 and the reflective lens 214, is focused by the object lens 215 and is projected on the object S. The beam, after having been reflected via the object S, passes the object lens 215 and is then reflected via the reflective lens 214 and divided into a first sub-beam B1 and a second sub-beam B2 by the beam splitter 213 and the polarized beam splitter 216. The first sub-beam B1, after passing through the first magnification adjustment lens 211, is projected on the first the photo-sensor 219. The second sub-beam B2, after passing through the second magnification adjustment lens 221, is projected on the second photo-sensor 224.

Since the first magnification adjustment lens 211 and the second magnification adjustment lens 221 have different focuses (or different magnification rate), the imaging precision of the first imaging optical path L1 and the imaging precision of the second imaging optical path L2 would also be different. In the present embodiment, the focusing regulation unit 300' can adjust the distance between the object S and the object lens 215 by a driver according to the first imaging optical path L1 and the second imaging optical path L2 with different imaging precisions, so that the defocus position of the object S is closer to the focal point position of the object lens 215 like the focusing method as indicated in FIG. 3 to save the focusing time.

Fifth Embodiment

Figure 12:
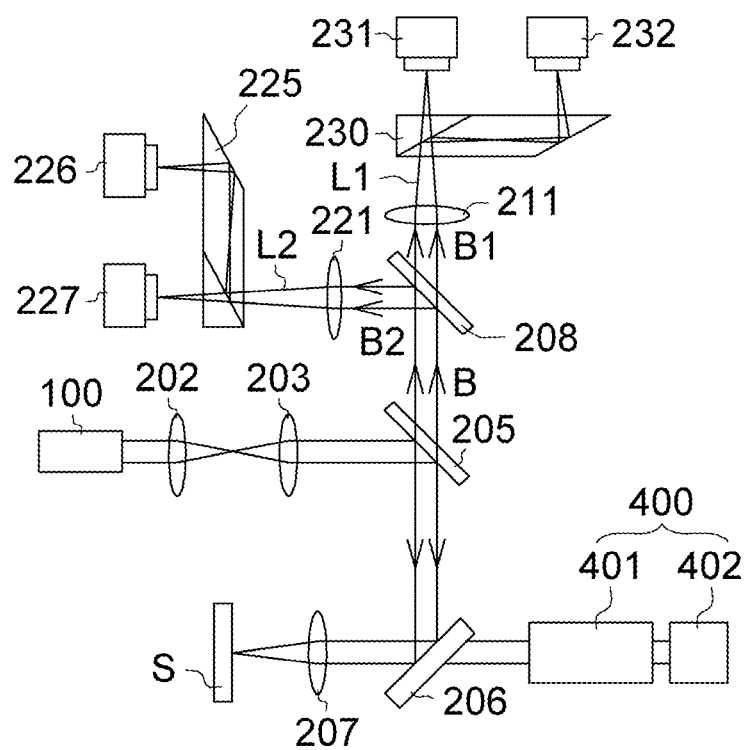
FIG. 12 respectively shows an optical path of an automatic focusing apparatus according to a fifth embodiment.

Referring to FIG. 12. The present embodiment of the disclosure is different from the first embodiment in that: the optical imaging unit 200' further includes a set of optical path differential beam splitters 225 and 230 respectively placed in the first imaging optical path L1 and the second imaging optical path L2 for dividing the first sub-beam B1 and the second sub-beam B2 into multiple beams with different optical distances projected on the photo-sensor. The first sub-beam B1, after passing through the first magnification adjustment lens 211 and an optical path differential beam splitter 230, is projected on two photo-sensors 231 and 232 respectively. The second sub-beam B2, after passing through the second magnification adjustment lens 221 and another optical path differential beam splitter 225, is projected on two photo-sensors 226 and 227 respectively. Since the first magnification adjustment lens 211 and the second magnification adjustment lens 221 have different focal lengths (or different magnification rates), the imaging precision of the first imaging optical path L1 and the imaging precision of the second imaging optical path L2 would also be different. In the present embodiment of the disclosure, the focusing regulation unit 300 can adjust the distance between the object S and the object lens 207 by a driver 302 according to the first imaging optical path L1 and the second imaging optical path L2 with different imaging precisions, so that the defocus position of the object S is closer to the focal point position of the object lens 207 like the focusing method like the focusing method as indicated in FIG. 3 to save the focusing time.

According to the automatic focusing apparatus and the method thereof disclosed in the above embodiments of the disclosure, the defocus position of the object is adjusted according to two imaging optical path with different imaging precisions to reduce focusing times. Since the focusing times are reduced and the defocus position of the object can be promptly adjusted to be closer to the focus position of the object lens, the automatic focusing apparatus and the method thereof disclosed in the above embodiments are capable of reducing the focusing time and increasing the focusing range and focusing speed in automatic focusing. Since the automatic focusing apparatus requires fewer optical elements, the assembly is made much easier and both the volume and the cost can be effectively reduced.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic focusing apparatus, comprising:
a light source for generating a beam;
an optical imaging unit comprising an object lens and a beam splitter, wherein the object lens focuses the beam, so that the beam is projected on an object and reflected via the object to form a reflecting beam, the reflecting beam is divided into a first sub-beam and a second sub-beam by the beam splitter, and the optical imaging unit has a first imaging optical path and a second imaging optical path with different imaging precisions corresponding to the first sub-beam and the second sub-beam, respectively;
a photo-sensor for sensing an image formed by the first sub-beam or the second sub-beam to detect a defocus position of the object; and
a focusing regulation unit for performing focusing on a distance between the object and the object lens and selecting an imaging precision according to the defocus position of the object, so that the defocus position of the object is placed within the imaging precision of the first optical path and the imaging precision of the second optical path in sequence.

2. The automatic focusing apparatus according to claim 1, wherein the optical imaging unit further comprises a first magnification adjustment lens with a first focal length, and the first magnification adjustment lens is placed in the first imaging optical path for focusing the first sub-beam on the photo-sensor.

3. The automatic focusing apparatus according to claim 2, wherein the optical imaging unit further comprises a second magnification adjustment lens with a second focal length larger than the first focal length, and the second magnification adjustment lens is placed in the second imaging optical path for focusing the second sub-beam on the photo-sensor.

4. The automatic focusing apparatus according to claim 1, wherein the optical imaging unit further comprises a wave plate disposed in an optical path that the beam passes through before the beam is projected to the object or disposed in an optical path that the beam passes through after the beam is projected to the object.

5. The automatic focusing apparatus according to claim 1, wherein the optical imaging unit further comprises an optical path switch movably disposed in the first imaging optical path or the second imaging optical path that the reflecting beam passes through for switching the first sub-beam and the second sub-beam before the reflecting beam enters the photo-sensor.

6. The automatic focusing apparatus according to claim 1, wherein the beam splitter is a polarized beam splitter.

7. The automatic focusing apparatus according to claim 1, wherein the optical imaging unit further comprises at least an optical path differential beam splitter for dividing the first sub-beam and the second sub-beam into multiple beams with different optical distances.

8. An automatic focusing apparatus, comprising:
a light source for generating a beam;
an optical imaging unit comprising an object lens and a reflective lens, wherein the object lens focuses the beam, so that the beam is projected on an object and reflected via the object to form a reflecting beam, the reflective lens switches the reflecting beam to a first imaging optical path or a second imaging optical path;

a photo-sensor for sensing an image formed in the first imaging optical path and the second imaging optical path to detect a defocus position of the object; and a focusing regulation unit for focusing a distance between the object and the object lens and selecting an imaging precision according to the defocus position of the object, so that the defocus position of the object is placed within the imaging precision of the first optical path and the imaging precision of the second optical path in sequence.

9. The automatic focusing apparatus according to claim 8, wherein the optical imaging unit further comprises a first magnification adjustment lens with a first focal length, and the first magnification adjustment lens is placed in the first imaging optical path for focusing the beam on the photo-sensor.

10. The automatic focusing apparatus according to claim 9, wherein the optical imaging unit further comprises a second magnification adjustment lens with a second focal length larger than the first focal length, and the second magnification adjustment lens is placed in the second imaging optical path for focusing the beam on the photo-sensor.

11. The automatic focusing apparatus according to claim 8, wherein the optical imaging unit further comprises a wave plate disposed in an optical path that the beam passes through before the beam is projected to the object or disposed in an optical path that the beam passes through after the beam is projected to the object.

12. An automatic focusing method, comprising:

emitting a beam;

focusing the beam by an object lens, so that the beam is projected on an object and reflected via the object to form a reflecting beam;

dividing the reflecting beam into a first sub-beam and a second sub-beam, and enabling the first sub-beam and the second sub-beam to be placed in a first imaging optical path and a second imaging optical path with different imaging precisions respectively;

sensing an image formed by the first sub-beam or the second sub-beam by a photo-sensor to detect the defocus position of the object;

performing a first focusing on a distance between the object and the object lens according to the defocus position of the object, so that the defocus position of the object is placed within an imaging precision of the first optical path; and selecting an imaging precision corresponding to the second imaging optical path and performing a second focusing on the distance between the object and the object lens, so that the defocus position of the object is placed within an imaging precision of the second optical path.

* * * * *